(12) United States Patent
Fahl

(10) Patent No.: US 7,896,027 B2
(45) Date of Patent: Mar. 1, 2011

(54) POPPET VALVE ASSEMBLY WITH IN-LINE SIGHT GLASS

(75) Inventor: Richard L. Fahl, Fairfield, OH (US)

(73) Assignee: Dixon Valve and Coupling Company, Chestertown, MD (US)

( * ) Notice: Subject to any disclaimer, the term of this patent is extended or adjusted under 35 U.S.C. 154(b) by 555 days.

(21) Appl. No.: 12/046,082

(22) Filed: Mar. 11, 2008

(65) Prior Publication Data

US 2009/0229686 A1  Sep. 17, 2009

(51) Int. Cl.
*F16K 37/00* (2006.01)

(52) U.S. Cl. .......................... 137/559; 137/219; 116/276

(58) Field of Classification Search .................. 137/219, 137/559; 116/276
See application file for complete search history.

(56) References Cited

U.S. PATENT DOCUMENTS

| | | | | |
|---|---|---|---|---|
| 390,584 A * | 10/1888 | Bennett | ......................... | 137/559 |
| 391,143 A * | 10/1888 | Hadden | ......................... | 137/559 |
| 574,765 A * | 1/1897 | Semans | ......................... | 137/559 |
| 982,434 A * | 1/1911 | Koss | .............................. | 137/559 |
| 1,394,665 A * | 10/1921 | Bruneau | ....................... | 137/559 |
| 2,004,611 A * | 6/1935 | Kleinfelder | ................... | 116/276 |
| 2,378,985 A * | 6/1945 | Davis | ............................ | 116/276 |
| 4,022,245 A * | 5/1977 | Davis | ............................ | 137/559 |
| 4,474,209 A * | 10/1984 | Akhtarekhavari | ........... | 137/559 |
| 4,643,224 A * | 2/1987 | Rung et al. | .................... | 137/559 |
| 4,655,078 A * | 4/1987 | Johnson | ....................... | 137/559 |
| 4,813,449 A | 3/1989 | Fahl | | |
| 6,679,291 B1 | 1/2004 | Fahl et al. | | |
| 2005/0264003 A1 * | 12/2005 | Warden | .......................... | 285/55 |

* cited by examiner

*Primary Examiner* — John Rivell
(74) *Attorney, Agent, or Firm* — Wood, Herron & Evans, LLP

(57) ABSTRACT

A poppet valve assembly is provided for use on a fuel tanker truck which enables the truck's driver to determine whether fuel is flowing through the valve assembly and whether fuel is present in the valve assembly. The valve assembly has a two part housing, one of the parts having a sight glass secured therein. The sight glass is visible through cutouts in the housing. When the poppet valve is opened, fluid flows through a flow channel in the valve assembly. The fluid, being different colors, may be easily seen through the sight glass from a distance.

19 Claims, 9 Drawing Sheets

POPPET VALVE ASSEMBLY WITH IN-LINE SIGHT GLASS

FIELD OF THE INVENTION

This invention relates generally to poppet valve assemblies for controlling flow therethrough of a fluid, such as gasoline from a gasoline tank truck into an underground storage tank at a filing station.

BACKGROUND OF THE INVENTION

In order to fill one or more underground storage tanks at a gasoline service station, a cargo tank truck typically pulls into the service station and unloads the fuel from the truck into the underground storage tank or tanks. Such a cargo tank truck commonly has multiple fuel storage compartments, each compartment having a cover and a pipe located below the tank to which is connected a valve assembly. The valve assembly is commonly a poppet valve assembly which is opened and closed by the truck's driver via a handle extending upwardly from the valve assembly. In order to unload fuel from one of the truck's fuel storage compartments into the underground storage tank, the truck driver or operator connects two hoses from the truck to elbows on the underground storage tank. One of the hoses is a vapor recovery hose which returns vapors to the truck from the underground storage tank. The other hose is connected at one end to one of the valve assemblies on the truck via an adaptor and at the other end to the underground storage tank. In order to cause fuel to flow through this hose to the underground storage tank, the truck driver simply opens the valve assembly.

Commonly, each underground storage tank has a valve therein, which closes when the underground storage tank is sufficiently full, thereby stopping the flow of fuel from the truck to the underground storage tank. After this valve in the underground storage tank closes, gasoline or fuel is still present in the line or hose extending between the cargo tank truck compartment and the underground storage tank. In order to prevent gasoline from overflowing onto the pavement of the service station, the operator of the cargo tank truck closes the valve assembly on the cargo truck and opens one of the cam arms on the adaptor, thereby allowing air to enter the hose. The air in the hose forces the fuel in the hose towards the underground storage tank and through a bleeder hole in the valve in the underground storage tank. After a sufficient time period has passed, the operator simply disconnects the adaptor from the valve assembly, removes the hose from the elbow of the underground storage tank and places the hose on the truck. After the vapor recovery hose is disconnected and placed on the truck the driver may move to the next location.

In order to prevent an accidental overflow, it is desirable for the cargo tank truck operator or driver to know if liquid is present in the valve assembly, and if liquid is flowing through the valve assembly. The operator does not want to disconnect the adaptor from the valve assembly of the truck with liquid present in the valve assembly or flowing therethrough. Consequently, it is advantageous for the driver to know whether fluid is present in the valve assembly and whether the flow of fuel through the hose has stopped.

Poppet valve assemblies are known which have a sight glass built therein in which a float is located in order to indicate liquid presence in the valve assembly. The float commonly comprises a hollow ball. When liquid is present in the sight glass, the float raises because its density is less than the density of gasoline. Thus, the operator is able to tell whether fuel is present in the valve assembly. U.S. Pat. No. 6,679,291 discloses such a poppet valve assembly with a sight glass on one side of the valve housing.

When unloading fuel from a tanker truck, it is desirable to know which type of fluid is passing through the valve assembly into the underground storage tank. This is important to ensure that the correct fuel is being placed in the correct underground storage tank. Motor fuels are dyed different colors to aid in their identification. For example, diesel may be colored red while a certain type of unleaded fuel may be colored yellow and another type of unleaded fuel colored blue. Different methods have been used to allow an operator to view the color of the fuel either before the valve assembly is opened to allow fuel to flow through the valve assembly into its desired location or while fluid is flowing through the valve assembly.

One such method, shown in FIGS. 1 and 1A, involves securing a sight glass between the mounting flange of a discharge pipe of the truck and a poppet valve assembly. One disadvantage with using this type of in-line sight glass is that the sight glass is highly stressed by the bolts that attach it to the mounting flange of a discharge pipe of a truck. The result is that the sight glass has a short lifespan and must be replaced often. Due to the large size of such a sight glass, repair is costly and may remove the tanker truck from operation for a lengthy period of time.

Another method, shown in FIGS. 2 and 2A, involves securing a sight glass assembly between the mounting flange of a discharge pipe of the truck and a poppet valve assembly. This sight glass assembly uses a smaller sight glass than the one described in the above paragraph. This sight glass is contained within a metal brace. Therefore, the metal brace, as opposed to the sight glass, bears the stresses imposed by the mounting bolts. One disadvantage with using this type of in-line sight glass is that from a distance it may be difficult to view the color of the fuel, and therefore the type of fuel, passing through the sight glass. Another disadvantage with using this type of in-line sight glass assembly is the high cost of the sight glass assembly due to its multiple components and required assembly.

Each of these methods requires securing an element or elements between the mounting flange of the discharge pipe on the truck and the mounting flange of a poppet valve assembly, thereby increasing the chance of leaks or spills while increasing the cost of assembly, i.e. more labor. Therefore, it has been one objective of the present invention to provide a poppet valve assembly having an in-line sight glass incorporated into the poppet valve assembly which enables one to determine whether fuel is present in the poppet valve assembly from a distance and if so, which color fuel or fuel type.

SUMMARY OF THE INVENTION

The invention which accomplishes these and other objectives comprises a poppet valve assembly for use on a fuel tanker truck for loading fuel onto the truck or unloading fuel from the truck, most commonly into an underground storage tank at a service station.

The poppet valve assembly comprises a housing having a flow passage therethrough. The flow passage has a central axis. In one embodiment, the housing is a two-part housing comprising front and rear pieces joined together.

The poppet valve assembly further comprises a poppet structure for controlling fluid flow through the flow passage. The poppet structure is operatively coupled to a handle so that when an operator pulls on the handle, the poppet structure moves axially, thereby opening the valve and enabling fuel to flow through the flow passage.

An in-line sight glass is mounted inside the housing. The sight glass, in one embodiment, comprises one piece of see-through material such as acrylic or other plastic. The sight glass is preferably made of one piece of plastic, but may be made of multiple pieces. The sight glass is preferably made of acrylic but may be made of any see through material such as glass. The sight glass is generally cylindrical and has an axis which is generally coaxial with the central axis of the flow passage. The sight glass has an opening which is in fluid communication with the flow passage. The sight glass is held inside the housing with a retainer and is visible from a distance due to cutouts in the housing. The size and shape of the cutouts in the housing enable a truck operator to determine from a distance: 1) whether fuel is present in the poppet valve assembly and 2) the color of the fuel in the poppet valve assembly, i.e. the type of fuel in the poppet valve assembly. Being able to quickly and easily determine these items may prevent the operator from accidently opening the poppet valve assembly and pouring the wrong fuel in the wrong tank.

The size and shape/configuration of the in-line sight glass are such that it may be made at a relatively low cost. The poppet valve assembly enables a truck operator determine whether the correct fluid is present in the poppet valve assembly easily from a distance before pulling the handle to open the valve. Thus, the poppet valve assembly of this invention helps prevent an operator from accidently discharging the wrong fluid into the wrong underground storage tank.

These and other objects and advantages of this invention will be more readily apparent from the following drawings.

DETAILED DESCRIPTION OF THE INVENTION

Figure 3:
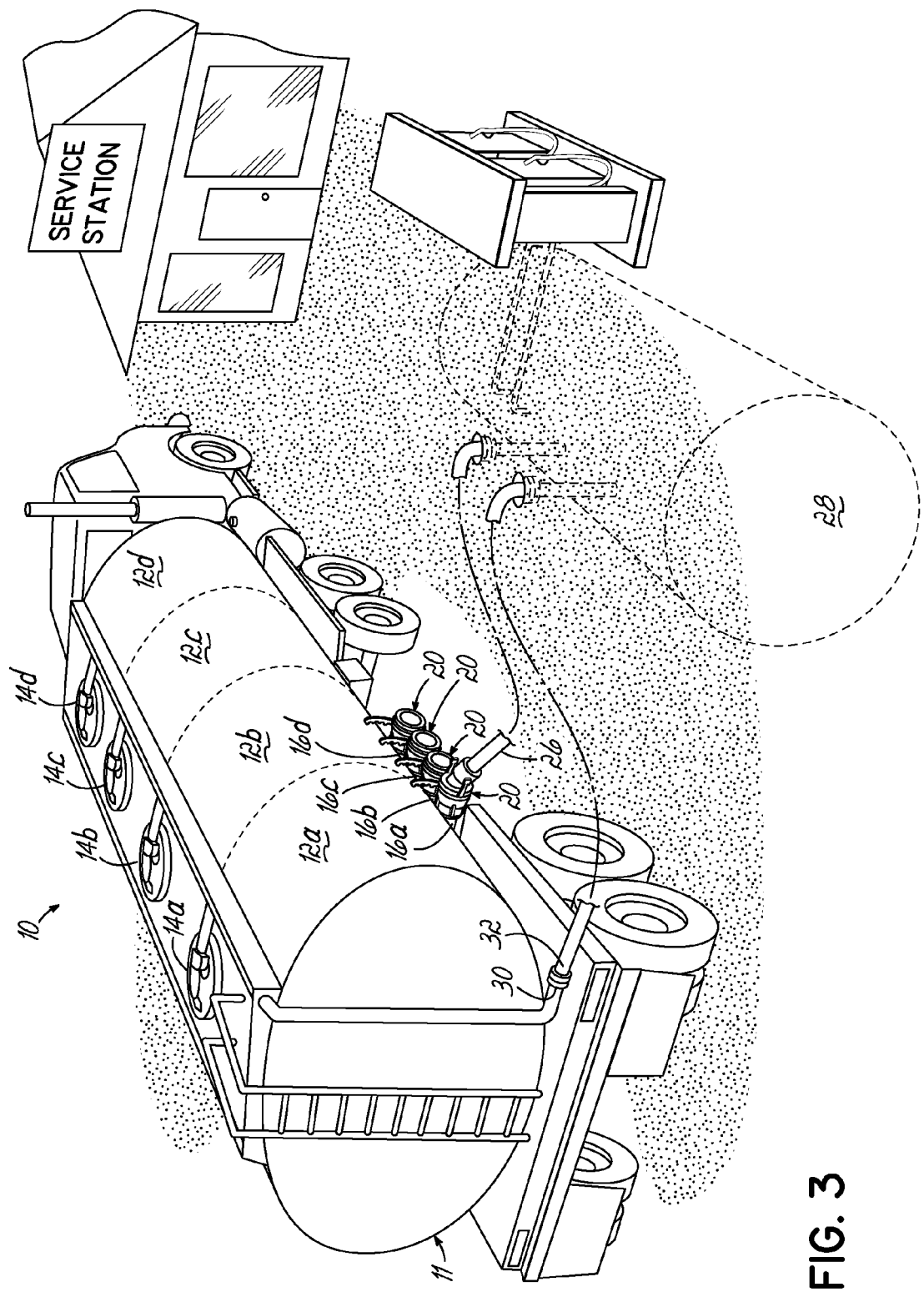
FIG. 3 is a perspective view of a fuel tanker truck unloading fuel into a underground storage tank at a service station.

Referring to the figures and particularly FIG. 3 there is illustrated a fuel tanker truck 10 having a tank 11 with four compartments 12a, 12b, 12c, and 12d having respective covers 14a, 14b, 14c, and 14d. Although the compartments are illustrated by dashed lines, these dashed lines are for illustration purposes only. The truck may have any number of compartments in any location. Below the tank 11 are a plurality of pipes 16a, 16b, 16c, and 16d in fluid communication with the compartments 12a, 12b, 12c, and 12d, respectively. Each of the pipes 16a, 16b, 16c, and 16d has a poppet valve assembly 20 secured to a mounting flange at the end thereof.

Figure 4:
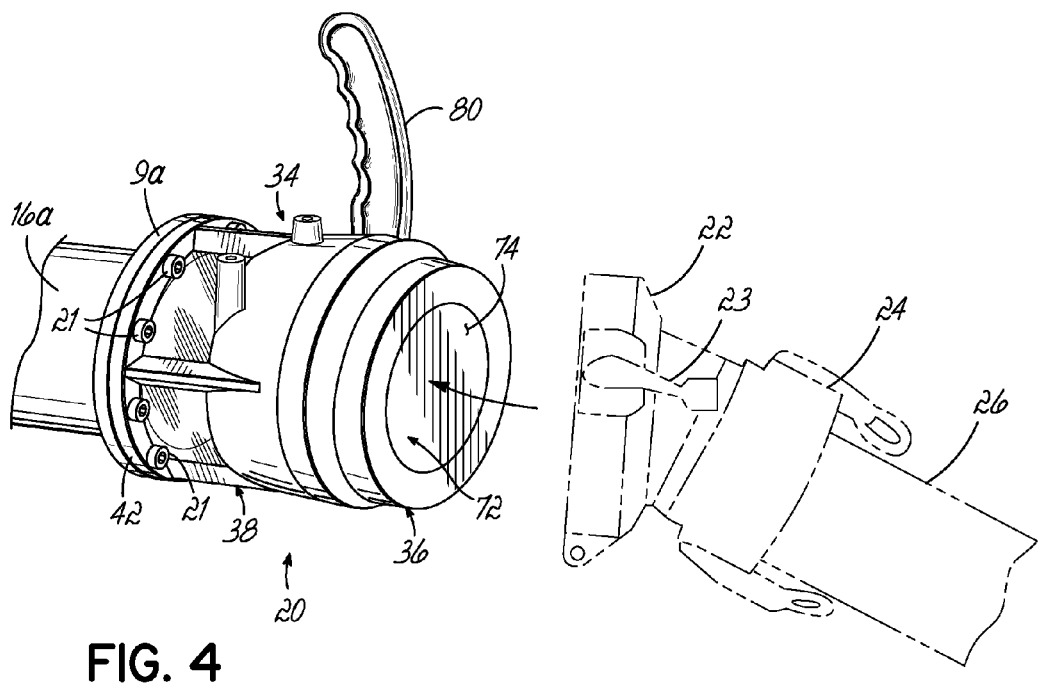
FIG. 4 is a perspective view of the poppet valve assembly of the present invention mounted on a pipe of a fuel tanker truck to which an adapter and hose are being connected.

As illustrated in FIG. 4, pipe 16a has a mounting flange 9a at the end thereof. Poppet valve assembly 20, and more particularly a rear mounting flange 42 of the poppet valve assembly 20 is secured to the mounting flange 9a of the discharge pipe 16a with bolts 21 in a manner known in the art. The poppet valve assembly 20 is the subject of the present invention and is described in more detail below.

As shown in FIGS. 3 and 4, an adaptor 22 is operatively coupled to a coupler 24 secured to the end of the hose 26 which extends to an underground storage tank 28. The adaptor 22 has a pair of cam arms 23 (only one being shown) which secure the adaptor 22 to the poppet valve assembly 20. A vapor recovery fitting 30 forms part of the truck 10 and is connected to a vapor recovery hose 32 which extends between the vapor recovery fitting 30 and the underground storage tank 28, as is conventional in the art. The adaptor 22, coupler 24, hoses 26, 32, vapor recovery fitting 30 and storage tank 28 are all conventional in the art and are not considered a part of the present invention.

Figure 1:
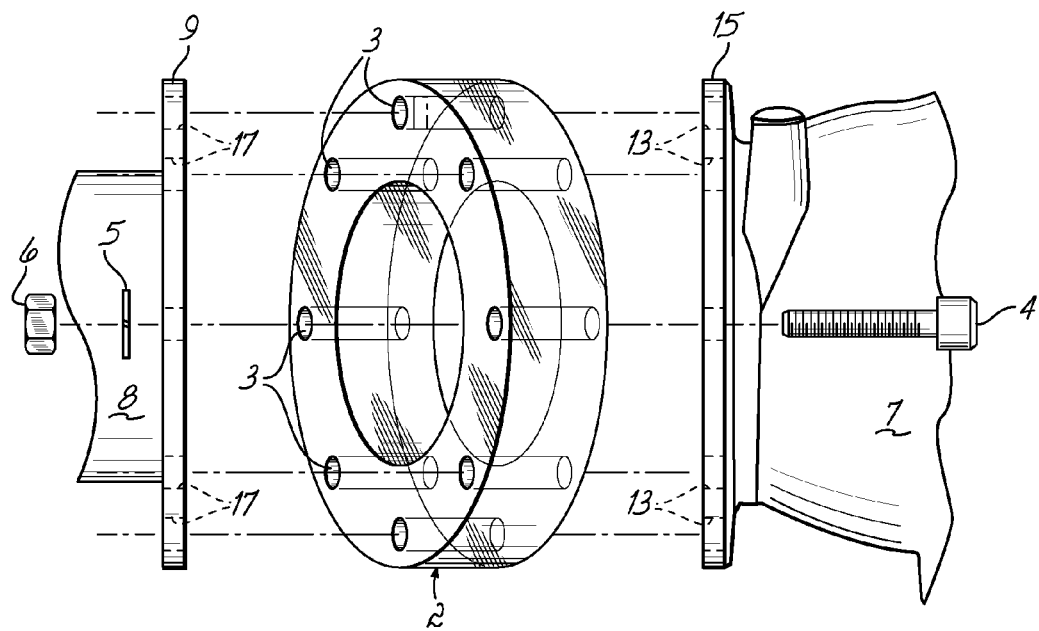
FIG. 1 is a partially disassembled view of a prior art in-line sight glass located between an outer flange of a discharge pipe of a tanker truck and a prior art poppet valve assembly.
Figure 1A:
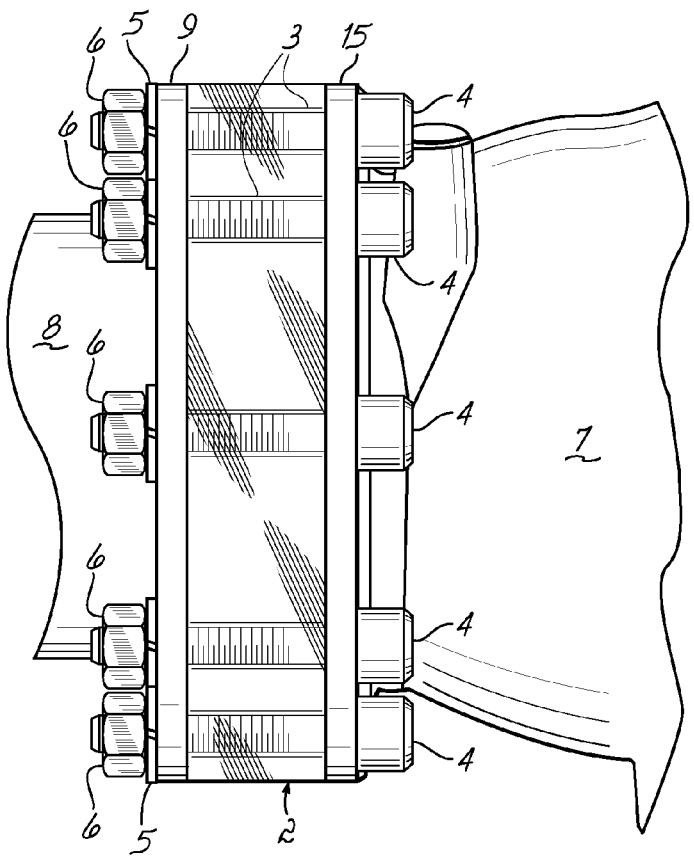
FIG. 1A is a side elevational view of the prior art in-line sight glass of FIG. 1 secured between the outer flange of the discharge pipe of a tanker truck and a prior art poppet valve assembly.

FIG. 1 illustrates a prior art in-line sight glass 2 having a plurality of holes 3 therethrough adapted to receive threaded bolts 4. As is conventional, a washer 5 and nut 6 are used to complete the connection of a prior art poppet valve assembly 7 to a discharge pipe 8 having a mounting flange 9. Many known prior art poppet valve assemblies have mounting flanges for this purpose, such as the poppet valve assembly disclosed in U.S. Pat. No. 4,813,449. As shown in FIGS. 1 and 1A, when assembled the bolts 4 pass through the holes 3 of the in-line sight glass 2, holes 13 in a rear mounting flange 15 of prior art poppet valve assembly 7 and holes 17 through the mounting flange 9 of the discharge pipe 8. As shown in FIG. 1A, bolts 4 are tightened with nuts 6, thereby squeezing the in-line sight glass 2 between the rear mounting flange 15 of prior art poppet valve assembly 7 and the mounting flange 9 of the discharge pipe 8. Stress caused by the connection between the prior art poppet valve assembly 7 and discharge pipe 8 give the in-line sight glass 2 a relatively short useful life and increase the frequency of repair/replacement of the in-line sight glass 2.

Figure 2:
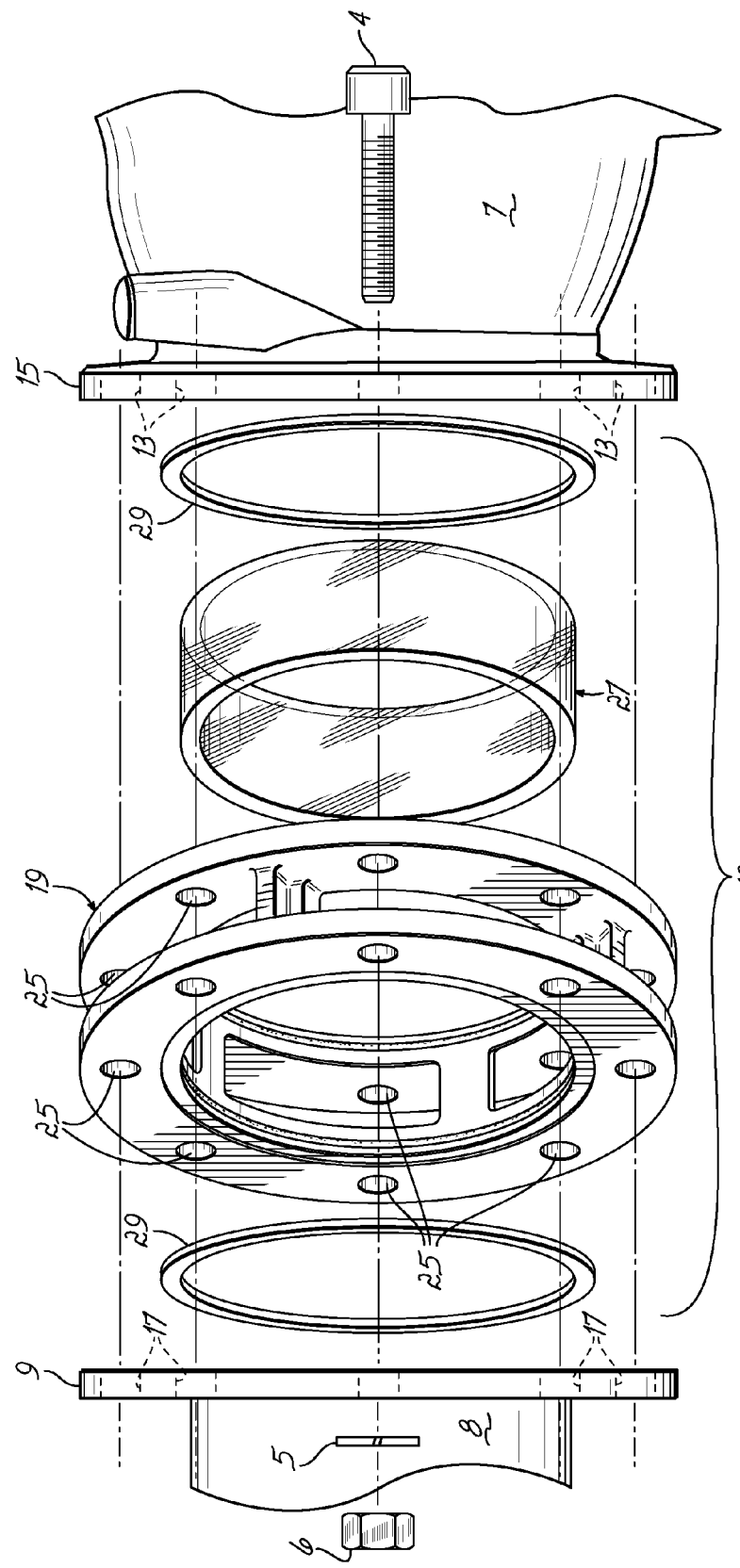
FIG. 2 is a partially disassembled view of a prior art in-line sight glass assembly located between an outer flange of a discharge pipe of a tanker truck and a prior art poppet valve assembly.
Figure 2A:
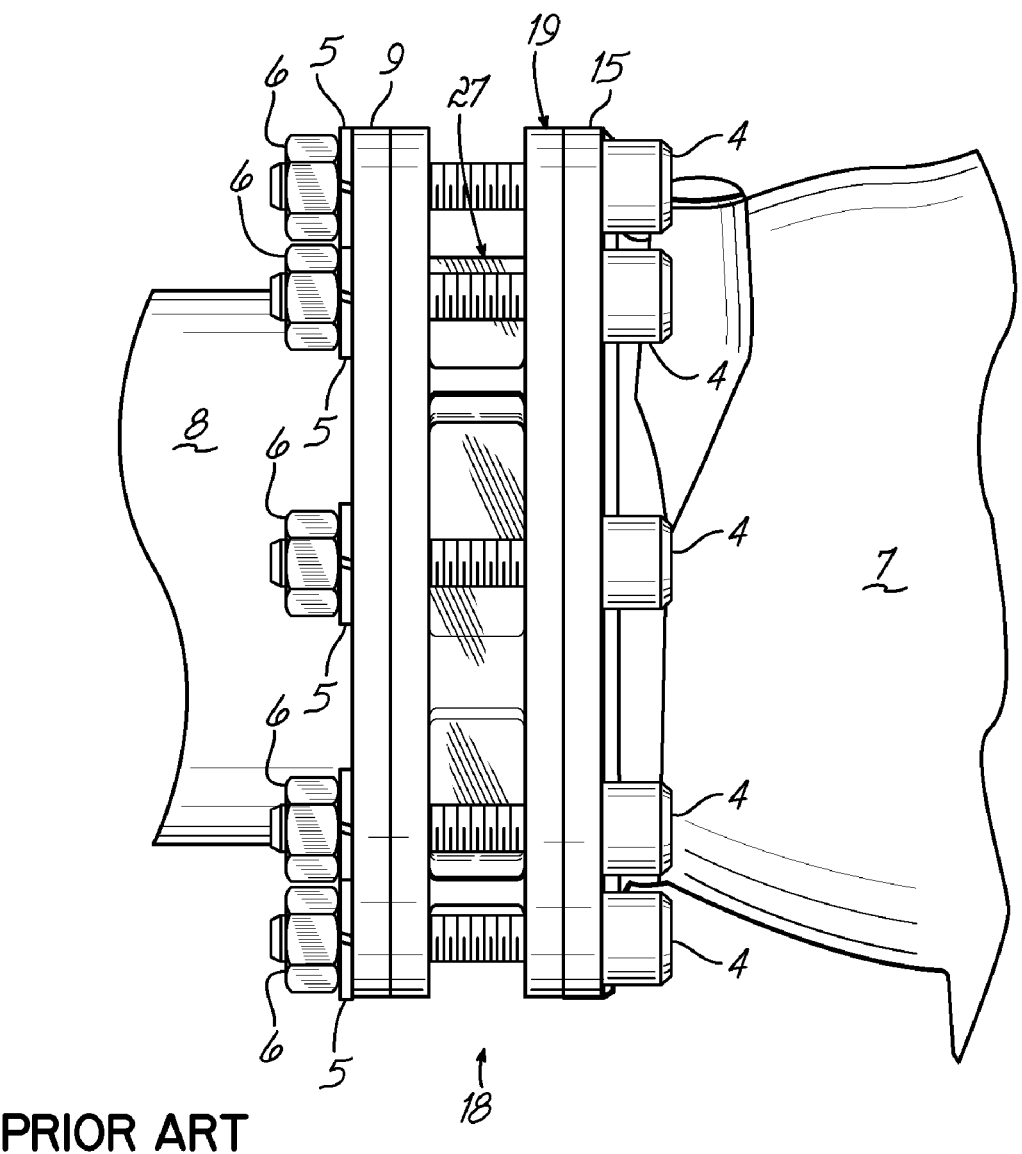
FIG. 2A is a side elevational view of the prior art in-line sight glass assembly of FIG. 2 secured between the outer flange of the discharge pipe of a tanker truck and a prior art poppet valve assembly.

FIGS. 2 and 2A illustrate a prior art in-line sight glass assembly 18 comprising a metal brace 19 having a plurality of holes 25 therethrough, a plurality of threaded bolts 4, a see-through sight glass 27 adapted to fit inside metal brace 19, a pair of o-rings 29, washers 5 and nuts 6. The prior art in-line sight glass assembly 18 is used to connect a prior art poppet valve assembly 7 to a discharge pipe 8 having a mounting flange 9. As shown in FIGS. 2 and 2A, when assembled the bolts 4 pass through the holes 25 of the metal brace 19, holes 13 in a rear mounting flange 15 of prior art poppet valve assembly 7 and holes 17 through the mounting flange 9 of the discharge pipe 8. As shown in FIG. 2A, bolts 4 are tightened with nuts 6, thereby squeezing the prior art in-line sight glass assembly 18 between the rear mounting flange 15 of prior art poppet valve assembly 7 and the mounting flange 9 of the discharge pipe 8. Although prior art in-line sight glass assembly 18 may reduce the frequency of repair/replacement of the in-line sight glass 27 as compared to the sight glass 2 shown in FIGS. 1 and 1A, prior art in-line sight glass assembly 18 is relatively expense to manufacture and the configuration of the metal brace 19 may not allow sufficient visibility of the fluid inside the sight glass 27.

Use of either prior art sight glass 2 and prior art in-line sight glass assembly 18 requires an additional piece or pieces to be secured between a rear mounting flange 15 of a prior art poppet valve assembly 7 and a mounting flange 9 of a discharge pipe 8. As shown in FIG. 4, the poppet valve assembly 20 of the present invention allows a straight connection between a rear mounting flange 9a of discharge pipe 16a on a truck 10 and a rear mounting flange 42 of poppet valve assembly 20 with no intermediate member therebetween. Advantages of poppet valve assembly 20 having an in-line sight glass are: 1) visibility of the fluid inside the poppet valve assembly 20 is greater than heretofore; 2) the amount of plastic used for the sight glass is reduced, reducing the cost of the poppet valve assembly; 3) the in-line sight glass of the poppet valve assembly has a longer useful life than prior art sight glasses because the in-line sight glass is not subject to compression stresses.

Figure 5:
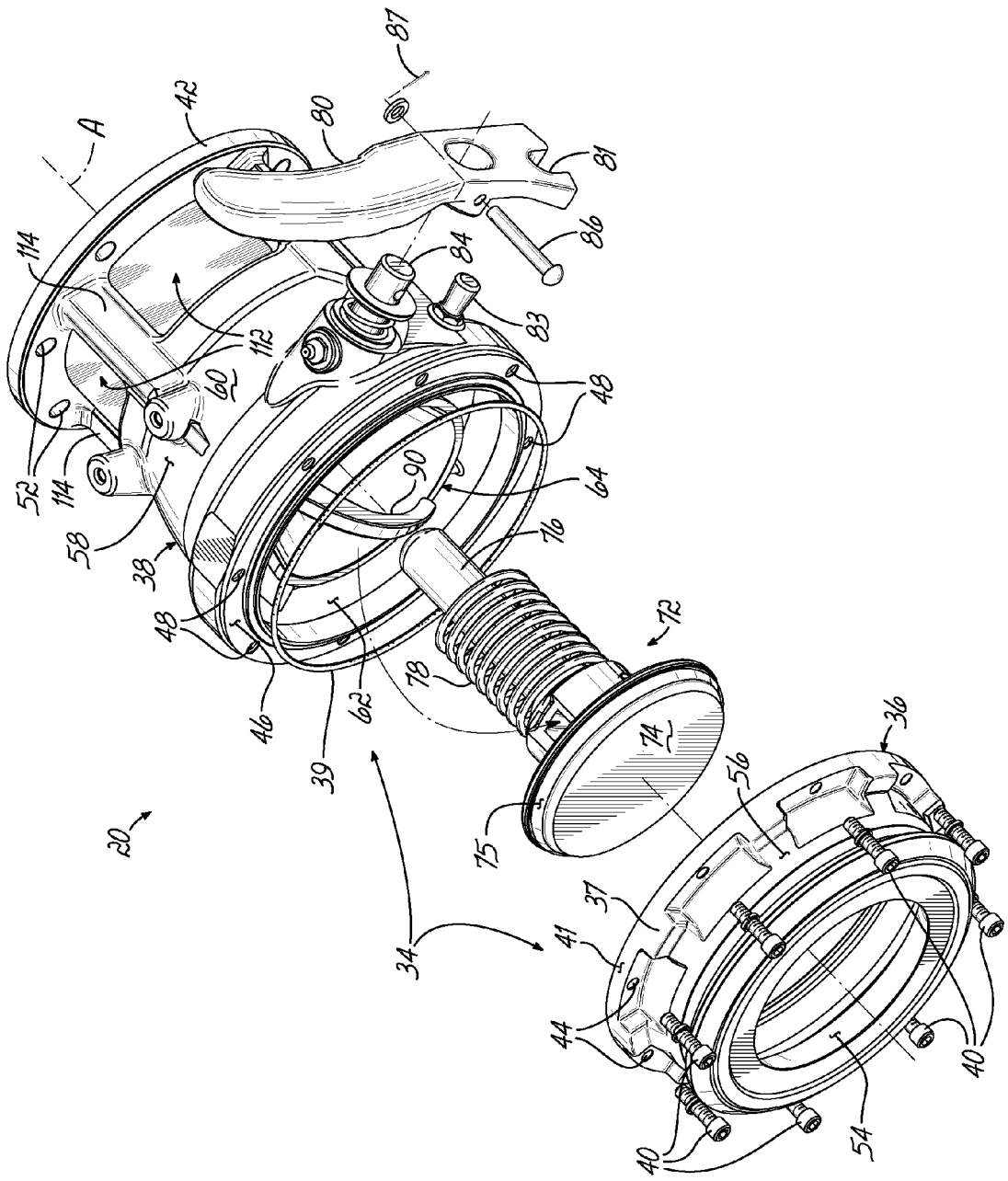
FIG. 5 is a partially disassembled view of the poppet valve assembly of FIG. 4.
Figure 6:
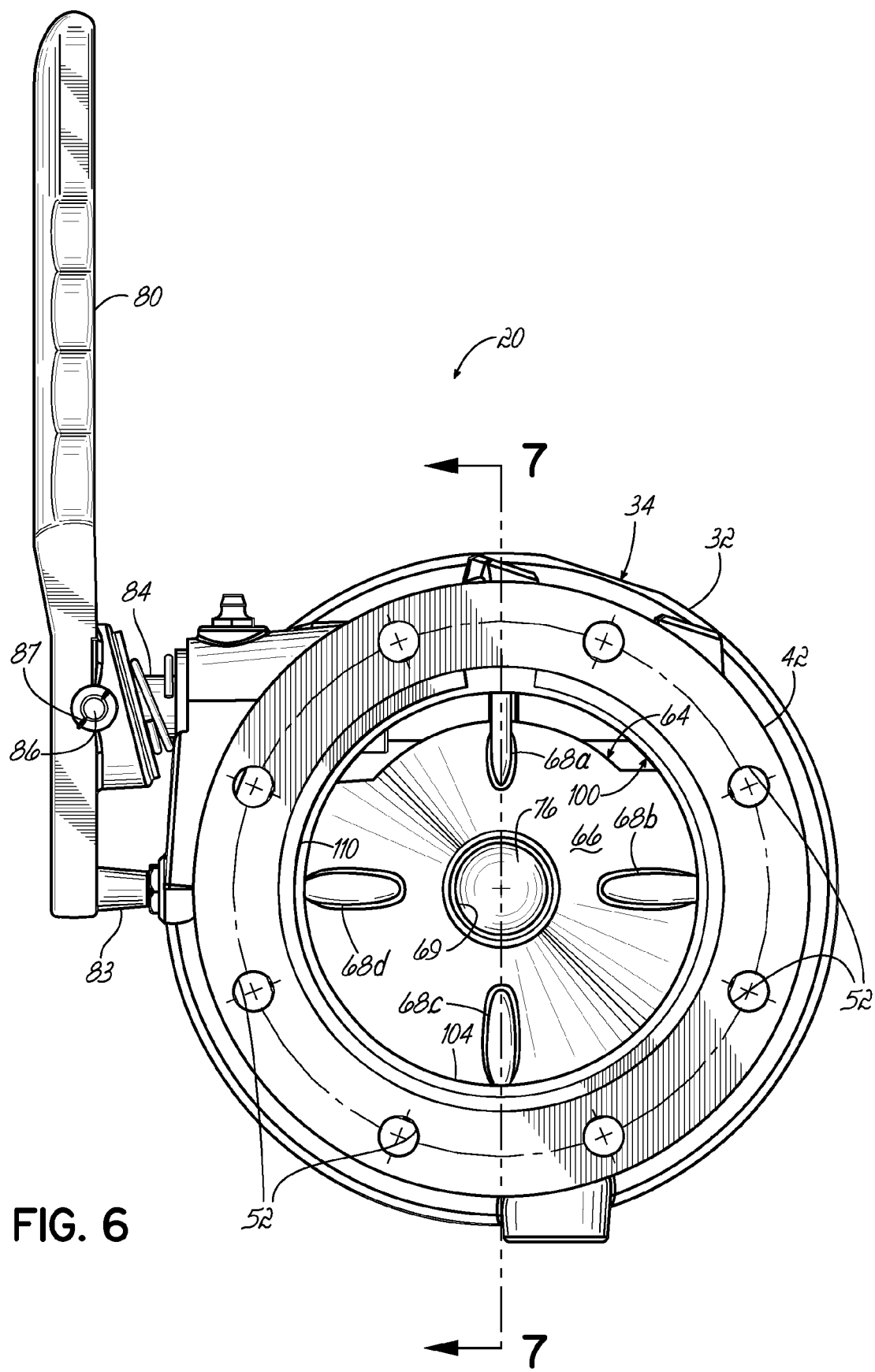
FIG. 6 is a rear end view of the poppet valve assembly of FIG. 5 in an assembled condition.
Figure 7:
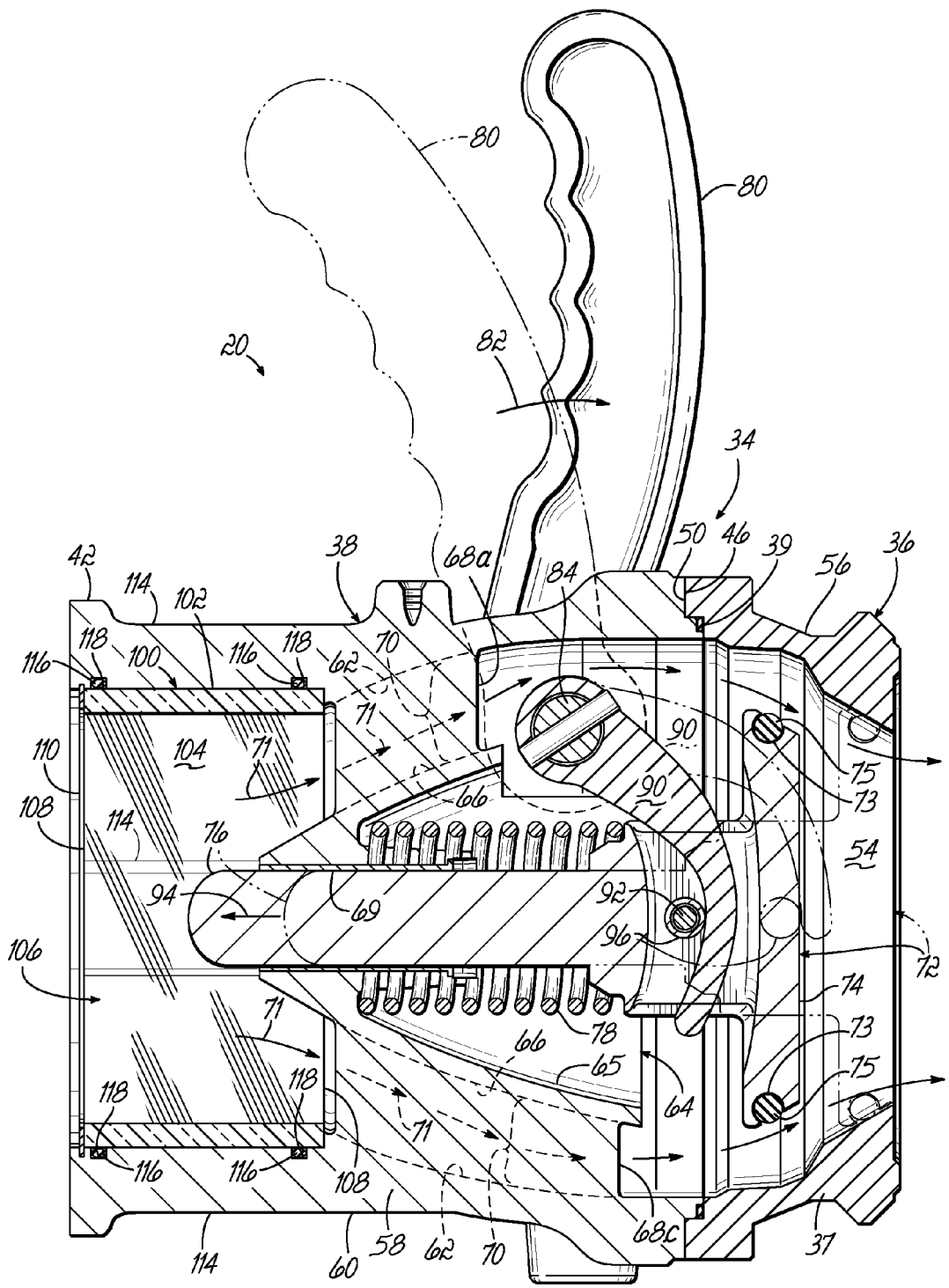
FIG. 7 is a view taken along the line of 7-7 of FIG. 6.

The poppet valve assembly 20 of the present invention is illustrated in detail in FIGS. 4-9. Referring to FIG. 5, the poppet valve assembly 20 comprises a two-part housing 34, having a front piece 36 and a rear piece 38 adapted to be joined with a plurality of fasteners 40. As shown in FIGS. 5 and 7, an o-ring 39 is located between the front and rear housing pieces 36, 38. The fasteners 40 are illustrated as being threaded bolts, but may be any other type of fastener.

As best illustrated in FIG. 7, the front piece 36 of the two-part housing 34 has a body 37 having an inside surface 54 and an outside surface 56. As shown in FIG. 5, the front piece 36 of the two-part housing 34 has a rear flange 41 with a plurality of circular openings 44 therethrough for passage of fasteners 40 for securing the housing pieces 36, 38 together. As shown in FIG. 5, the rear piece 38 of the two-part housing 34 has a front generally planar surface 46 with a plurality of threaded holes 48 around the circumference of the rear piece 38 of the two-part housing 34. The threaded holes 48 are adapted to receive and retain threaded fasteners 40 to secure the front and rear pieces 36, 38 of the two-part housing 34 together. As shown in FIG. 7, this front generally planar surface 46 of the rear piece 38 of the two-part housing 34 abuts a rear generally planar surface 50 of the front piece 36 of the two-part housing 34 when the housing 34 is assembled.

Figure 8:
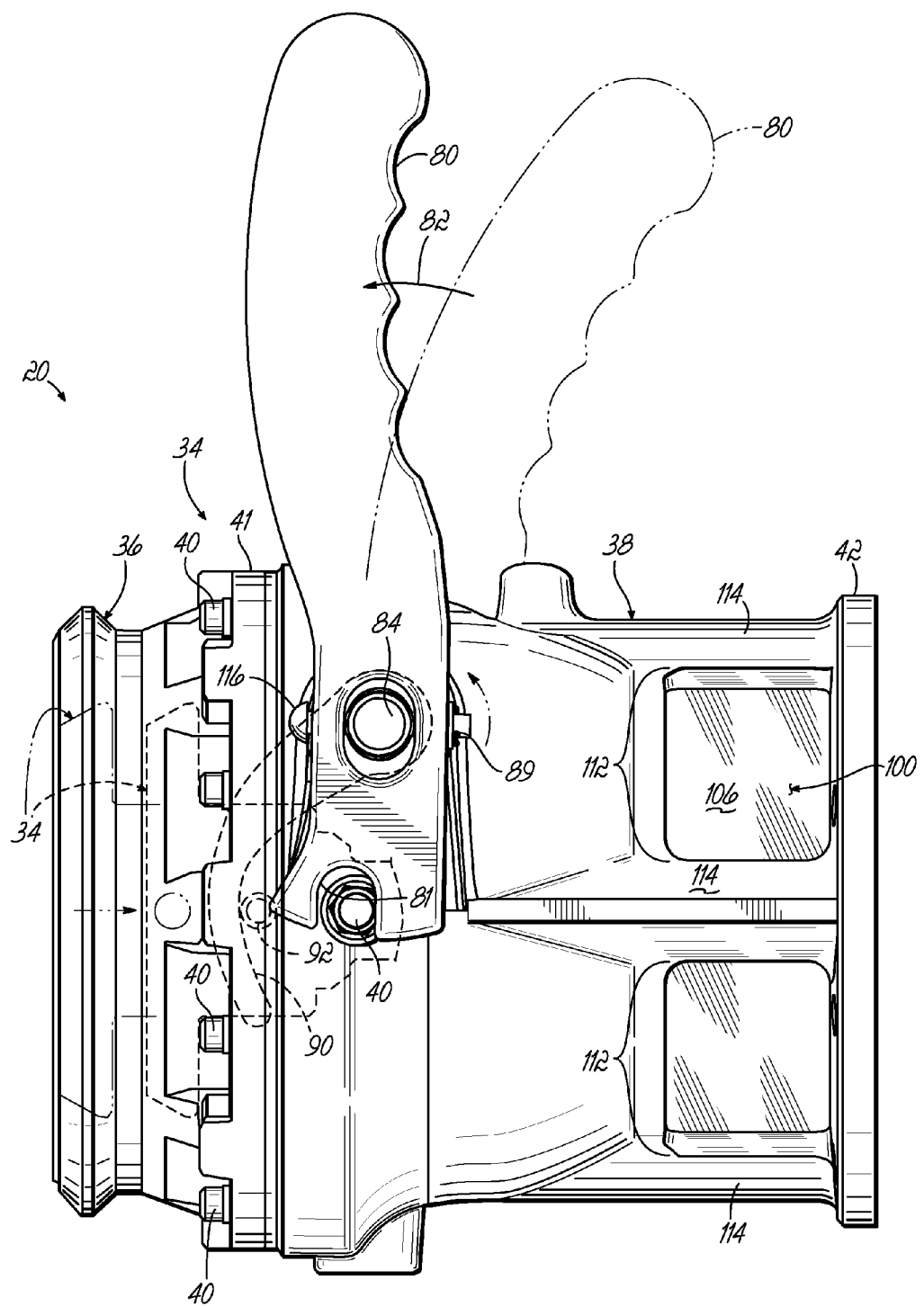
FIG. 8 is a side elevational view of the poppet valve assembly of FIG. 5 in an assembled condition.

The rear piece 38 of the housing 34 has a rear flange 42 with a plurality of openings 52 therethrough to secure the poppet valve assembly 20 to one of the pipes 16a, 16b, 16c, and 16d of the truck 10 with fasteners 21, See FIG. 4. As best illustrated in FIGS. 6 and 7, the rear piece 38 of the housing 34 has a outer portion 58 having an outer surface 60 and an inner surface 62. As seen in FIGS. 5 and 8, this outer portion 58 of the rear piece 38 of the housing 34 has a plurality of cutouts 112 between spaced vanes 114.

Figure 9:
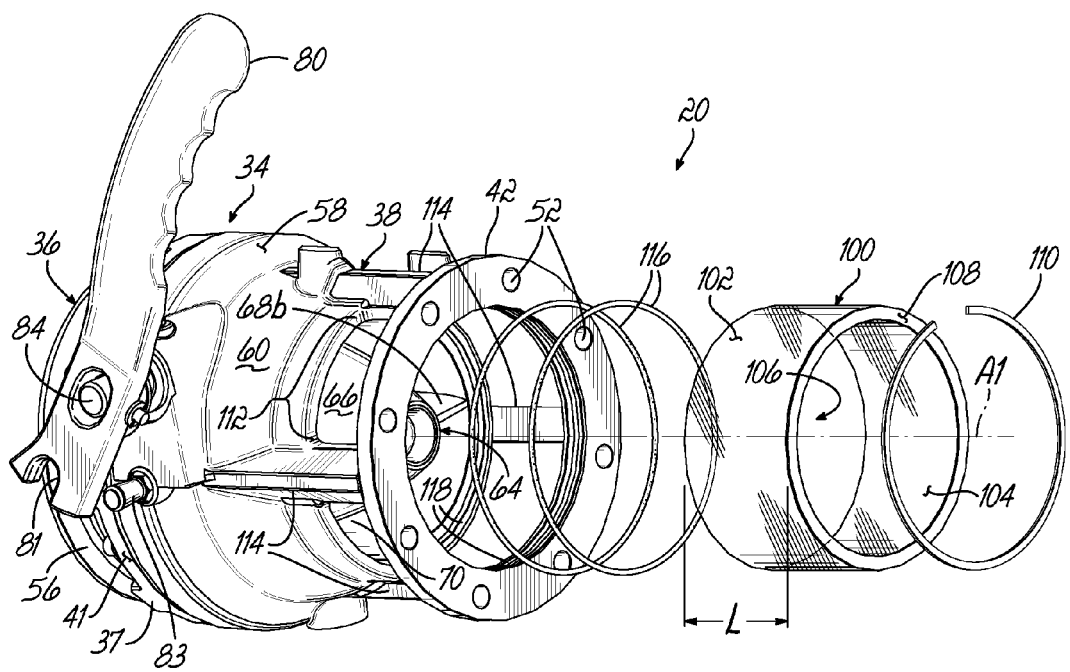
FIG. 9 is a partially disassembled view of the poppet valve assembly of FIG. 5.

As shown in FIGS. 7 and 9, the rear piece 38 of the housing 34 also has an inner annular portion 64 having a generally conical shape with an inner surface 65 and an outer surface 66. As shown in FIGS. 6, 7 and 9, four spaced ribs 68a, 68b, 68c and 68d extend between the outer portion 58 of the rear piece 38 of the housing 34 and the inner annular portion 64 of the rear piece 38 of the housing 34. As shown in FIG. 7, a flow passage 70 is defined between the outer surface 66 of the inner annular portion 64 and the inner surface 62 of the outer portion 58 of the rear housing piece 38. Fluid flows through the flow passage 70 around the ribs 68a, 68b, 68c and 68d. See arrows 71 of FIG. 7.

As best illustrated in FIGS. 5 and 7, a poppet structure 72 having a generally circular front portion 74 and a rear portion 76 is biased forwardly in a forward or closed position by a spring 78 as is conventional in poppet valve assemblies. The front portion 74 of poppet structure 72 has a groove 73 in which resides an o-ring 75, as shown in FIG. 7. The poppet structure 72 is movable via handle 80 between a first or forward position and a second or rear position (the second or rear position being shown in solid lines in FIG. 7 and the first or forward position being shown in dashed lines in FIG. 7). When the poppet structure 72 is in its closed forward position, the o-ring 75 partially within the front portion 74 of the poppet structure 72 contacts the inner surface 54 of the front housing piece 36, thereby preventing fluid flow through the flow passage 70 of poppet valve assembly 20. See FIG. 7. Between the poppet structure 72 and the housing 34 is a flow passage 70 having a central axis A. See FIG. 7 When the poppet valve assembly 20 of the present invention is opened, i.e. the poppet structure 72 moved rearwardly to its open rear position, fuel flows through the flow passage 70 in the direction of arrows 71 from the rear to the front of the poppet valve assembly 20 (to the right in FIG. 7).

As shown in FIGS. 6 and 7, rear portion 76 of the poppet structure 72 moves inside a guide 69 which is part of the inner annular portion 64 of the rear housing piece 38.

As shown in FIGS. 6-8, in order to move the poppet structure 72 in a rearward direction against the bias of the spring 78, a handle 80 is pulled forwardly by the operator of the truck in the direction of arrow 82. The handle 80 is operatively coupled to a rotatable or pivotal shaft 84 with a locking pin 86 held in place with a cotter pin 87. Rotation of the shaft 84 in the direction of arrow 82 (clockwise as shown in FIG. 7) causes a cam 90 to pull a pin 92 connected to the poppet structure 72 rearwardly, i.e. in the direction of arrow 94 from a closed position shown in dashed lines in FIG. 7 to an open position shown in solid lines in FIG. 7. A sleeve bearing 96 surrounds the pin 92. After the poppet structure 72 is moved rearwardly a sufficient distance, fluid may flow through the flow passage 70 inside the housing 34, out of the valve assembly 20 into the hose 26 and ultimately into the underground storage tank 28.

As shown in FIG. 5, the handle 80 has a slot 81 which receives a locking pin 83 extending outwardly from the outer surface 60 of the rear housing piece 38. When the slot 81 of handle 80 is engaged with the locking pin 83, the poppet structure 72 is held in its rear open position, enabling fluid to flow through flow passage 70. See FIG. 6.

As best illustrated in FIG. 9, a single piece in-line sight glass 100 is secured inside the rear piece 38 of the housing 34 and more particularly on the inside of the outer portion 58 of the rear housing piece 58. The sight glass 100 is generally cylindrical, has an outer surface 102 which defines its outer diameter, an inner surface 104 which defines an inner diameter or opening 106 of the sight glass 100. As shown in FIG. 9, the sight glass opening 106 has an axis A1 which is generally aligned or co-axial with the axis A of the flow channel 70 (see FIG. 5) when the poppet valve assembly 20 is assembled. When the poppet structure 72 is moved rearwardly (to the left in FIG. 7) by an operator pulling the handle 20 forwardly in the direction of arrow 82 (to the right in FIG. 7) fuel or fluid may pass through the opening 106 in sight glass 100 and through the flow channel 70 which is in fluid communication with the sight glass opening 106. As shown in FIG. 9, in-line sight glass 100 has a length L defined by generally parallel side surfaces 108. Although one size sight glass 100 is shown, any other size of sight glass may be used in accordance with the present invention.

The sight glass 100 is preferably made of transparent plastic such as acrylic which one may see through, although it may be made of any transparent or see through material. The sight glass 100 is visible at a distance through cutouts 112 of the outer portion 58 of the rear piece 38 of housing 34.

As shown in FIG. 9, the sight glass 100 is held in the rear piece 38 of the housing 34 with a retainer 110. Although retainer 110 is preferably made of metal, it may be made of any suitable material. As shown in FIGS. 7 and 9, a pair of o-rings 116 surround sight glass 100 and are located in grooves 118 in the rear piece 38 of the housing 34. These o-rings 116 provide a snug fit of the sight glass 100 inside the rear piece 38 of the housing 34.

Although I have described one preferred embodiment of my invention, I do not intend to be limited except by the scope of the following claims.

I claim:

1. A poppet valve assembly for use on a fuel tanker truck for loading or unloading fuel from said truck, said assembly comprising:
    a housing;
    a flow passage in said housing, said flow passage having a central axis;
    a poppet structure for controlling fluid flow through said flow passage;
    a handle operatively coupled to said poppet structure for moving said poppet structure to open and close said flow passage;
    a sight glass mounted inside said housing upstream of said poppet structure, said sight glass having an opening in fluid communication with said flow passage wherein said opening has an axis aligned with said central axis of said flow passage.

2. The poppet valve assembly of claim 1 wherein said sight glass is held inside said housing with a retainer.

3. The poppet valve assembly of claim 1 wherein said housing has cutouts for viewing said sight glass.

4. The poppet valve assembly of claim 1 wherein said sight glass has an outer diameter and an inner diameter defined by said opening.

5. The poppet valve assembly of claim 4 further comprising O rings around the outside diameter of the sight glass.

6. The poppet valve assembly of claim 1 wherein said sight glass is made of plastic.

7. The poppet valve assembly of claim 6 wherein said sight glass is made of acrylic.

8. The poppet valve assembly of claim 1 wherein said sight glass is made of see through material.

9. A poppet valve assembly for use on a fuel tanker truck for unloading fuel from said truck, said assembly comprising:
    a two part housing comprising a front piece and a rear piece joined together, said rear piece being upstream of said front piece;
    a flow passage in said housing, said flow passage having a central axis;
    a poppet structure for controlling fluid flow through said flow passage;
    a handle operatively coupled to said poppet structure for moving said poppet structure to open and close said flow passage;
    a sight glass mounted inside said rear piece of said housing, said sight glass having an opening in fluid communication with said flow passage wherein said opening has an axis aligned with said central axis of said flow passage.

10. The poppet valve assembly of claim 9 wherein said sight glass is held inside said housing with a retainer.

11. The poppet valve assembly of claim 10 wherein said retainer is metal.

12. The poppet valve assembly of claim 9 wherein said housing has cutouts for viewing said sight glass.

13. The poppet valve assembly of claim 9 wherein said sight glass has an outer diameter and an inner diameter defined by said opening.

14. The poppet valve assembly of claim 9 wherein said sight glass is made of plastic.

15. The poppet valve assembly of claim 9 wherein said sight glass is made of see through material.

16. A poppet valve assembly for use on a fuel tanker truck for loading or unloading fuel from said truck, said poppet valve assembly comprising:
    a housing;
    a flow passage in said housing;
    a poppet structure for controlling fluid flow through said flow passage;
    means for opening and closing said flow passage with said poppet structure;
    a sight glass mounted inside said housing upstream of said poppet structure, said sight glass having an opening in fluid communication with said flow passage wherein said opening has an axis aligned with said central axis of said flow passage.

17. The poppet valve assembly of claim 16 wherein said sight glass is made of plastic.

18. The poppet valve assembly of claim 16 wherein said sight glass is made of acrylic.

19. The poppet valve assembly of claim 16 wherein said sight glass is made of see through material.

* * * * *